United States Patent
Iwamura et al.

(10) Patent No.: US 8,750,107 B2
(45) Date of Patent: Jun. 10, 2014

(54) MOBILE COMMUNICATION METHOD AND MOBILE STATION

(75) Inventors: Mikio Iwamura, Tokyo (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 218 days.

(21) Appl. No.: 13/390,874

(22) PCT Filed: Aug. 13, 2010

(86) PCT No.: PCT/JP2010/063763
§ 371 (c)(1),
(2), (4) Date: Apr. 11, 2012

(87) PCT Pub. No.: WO2011/021584
PCT Pub. Date: Feb. 24, 2011

(65) Prior Publication Data
US 2012/0182869 A1 Jul. 19, 2012

(30) Foreign Application Priority Data
Aug. 17, 2009 (JP) .............................. P2009-188796

(51) Int. Cl.
*G01R 31/08* (2006.01)
(52) U.S. Cl.
USPC ......................... 370/230; 370/328; 370/312
(58) Field of Classification Search
USPC ........... 370/230, 328–339, 312; 455/405–408
See application file for complete search history.

(56) References Cited

U.S. PATENT DOCUMENTS

2013/0294380 A1 * 11/2013 Gazzard ........................ 370/329

FOREIGN PATENT DOCUMENTS

| JP | 2007-507174 A | | 3/2007 |
|---|---|---|---|
| WO | 2005/032079 A1 | | 4/2005 |
| WO | 2009/008456 A1 | | 1/2009 |
| WO | 2010/057540 A1 | | 5/2010 |
| WO | WO2010057540 | * | 5/2010 |

OTHER PUBLICATIONS

Office Action in corresponding Japanese Application No. 2009-188796 dated Feb. 12, 2013, with translation (4 pages).
Ericsson, "Contention based uplink transmissions," R2-093812, 3GPP TSG-RAN WG2 #66bis, Los Angeles, USA, Jun. 29-Jul. 3, 2009, 4 pages.
Abstract of WO2009/008456, published on Jan. 15, 2009, downloaded from the Espacenet Worldwide Database, 1 page.
International Search Report issued in PCT/JP2010/063763, mailed on Nov. 16, 2010, with translation, 4 pages.
Written Opinion issued in PCT/JP2010/063763, mailed on Nov. 16, 2010, 4 pages.

* cited by examiner

*Primary Examiner* — Ricky Ngo
*Assistant Examiner* — Iqbal Zaidi
(74) *Attorney, Agent, or Firm* — Osha Liang LLP

(57) ABSTRACT

A mobile communication system according to the present invention includes: a step A in which a radio base station eNB notifies a mobile station UE of a predetermined range; a step B in which the mobile station UE receives an uplink scheduling grant (uplink scheduling) including CB-RNTI (predetermined identification information that is not identification information of a designated mobile station), within the notified predetermined range; and a step C in which the mobile station UE transmits an uplink data signal, by using a shared uplink resource designated by the uplink scheduling grant, to the radio base station eNB.

2 Claims, 3 Drawing Sheets

MOBILE COMMUNICATION METHOD AND MOBILE STATION

TECHNICAL FIELD

The present invention relates to a mobile communication method and a mobile station.

BACKGROUND ART

The Standards Determination Committee for LTE (Long Term Evolution)-Advanced schemes has proposed adaptation of a contention-based uplink transmission control method using "Contention Based Grant". A contention-based uplink transmission control method using the "Contention Based Grant" will be simply described below.

Firstly, in addition to an uplink scheduling grant transmitted through PDCCH (Physical Downlink Control Channel) addressed to C-RNTI (Cell-Radio Network Temporary Identity) of a mobile station UE, the mobile station UE can monitor and receive an uplink scheduling grant transmitted though the PDCCH addressed to CB-RNTI (Contention Based-Radio Network Temporary Identity).

Secondly, when the mobile station UE has received an uplink scheduling grant transmitted though PDCCH addressed to CB-RNTI, an uplink data signal is transmitted through PUSCH (Physical Uplink Shared Channel) using TF (Transmission Format), MCS (Modulation and Code Scheme), RB (Resource Block) or the like that are designated by the uplink scheduling grant.

The mobile station UE adds "MAC CE (Control Element)" including the C-RNTI of the mobile station UE to the uplink data signal to enable identification of by whom the uplink data signal has been transmitted.

As a result, application of the contention-based uplink transmission control method using the "Contention Based Grant" is expected to be capable of a reduction in transmission delay of the uplink data signal by enabling omission of the L2 procedure of "transmission of scheduling request by mobile station UE"→"transmission of uplink scheduling grant by radio base station eNB", →"transmission of buffer status report by mobile station UE", →"transmission of uplink scheduling grant by radio base station eNB", →"transmission of uplink data signal by mobile station UE".

Application of contention-based uplink transmission control method using "Contention Based Grant" is expected to be capable of effective application to uplink resources that are not used after normal scheduling addressed to the C-RNTI.

SUMMARY OF THE INVENTION

Problems to be Solved by the Invention

However, the contention-based uplink transmission control method using the "Contention Based Grant" which has currently been examined has a problem in that a probability of the conflict of the uplink data signal may be increased or an interference amount of the uplink data signal may be increased due to an increase in the number of mobile stations UE which transmit the uplink data signal to the uplink scheduling grant transmitted via the PDCCH addressed to the same CB-RNTI.

Therefore, the present invention has been achieved in view of the above-mentioned problems, and an object thereof is to provide a mobile communication method and a mobile station, by which it is possible to decrease a possibility of the conflict of uplink data signals, in a contention-based uplink transmission control method using the "Contention Based Grant" described above.

Means for Solving the Problem

A first characteristic of the present embodiment is summarized in that a mobile communication method comprising, a step A in which a radio base station notifies a mobile station of a predetermined range, a step B in which the mobile station receives an uplink scheduling signal containing predetermined identification information within the notified predetermined range, the predetermined identification information not being identification information of a designated mobile station, and a step C in which the mobile station transmits an uplink data signal to the radio base station from, by using a shared uplink resource designated by the uplink scheduling signal.

A second characteristic of the present embodiment is summarized in that A mobile station comprising, a reception unit configured to receive an uplink scheduling signal containing predetermined identification information within a predetermined range notified from a radio base station, the predetermined identification information not being identification information of a designated mobile station, and a transmission unit configured to transmit an uplink data signal to the radio base station, by using a shared uplink resource designated by the uplink scheduling signal.

Effect of the Invention

As described above, according to the present invention, it is possible to provide a mobile communication method and a mobile station, by which it is possible to decrease a possibility of the conflict of uplink data signals, in a contention-based uplink transmission control method using the "Contention Based Grant" described above.

BEST MODES FOR CARRYING OUT THE INVENTION (Configuration of Mobile Communication System According to First Embodiment of the Present Invention)

A description will be given of the configuration of a mobile communication system according to a first embodiment of the present invention, with reference to FIGS. 1 to 3.

The mobile communication system according to the present embodiment is an LTE-Advanced mobile communication system that is configured to apply a contention-based uplink transmission control method using "Contention Based Grant" in relation to a mobile station UE that maintains an uplink synchronous state.

Figure 1:
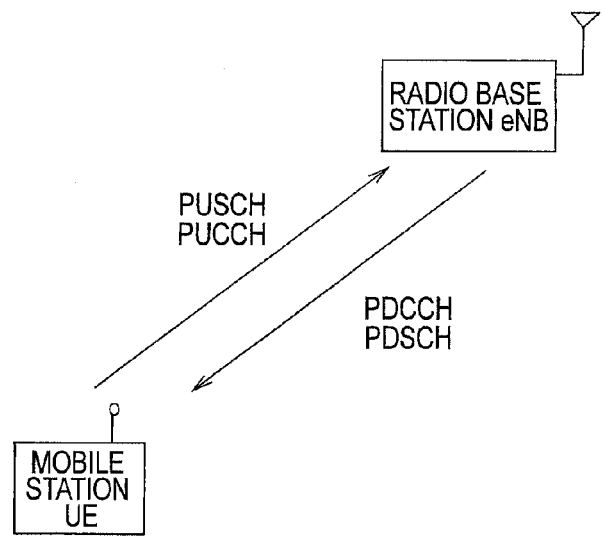
FIG. 1 is a diagram showing an entire configuration of a mobile communication system according to a first embodiment of the present invention.

As illustrated in FIG. 1, the mobile communication system according to the present embodiment is configured so that a mobile station UE transmits an uplink data signal through PUSCH to a radio base station eNB, and transmits an uplink control signal through PUCCH (Physical Uplink Control Channel).

Meanwhile, in the mobile communication system according to this embodiment, the radio base station eNB is configured to transmit a downlink data signal to the mobile station UE through PDSCH (Physical Downlink Shared Channel), and a downlink control signal such as an uplink scheduling grant or downlink scheduling information thereto through PDCCH.

Now, a description will be given of a method of assigning resources to the PDCCH and the PDSCH in the mobile communication system according to this embodiment, with reference to FIG. 2. Specifically, this method is defined in 3GPP Specification, TS36.213, chapter 8.

To one PDCCH, resources in units of one, two, four or eight CCEs (Control Channel Elements) are assigned. The number of CCEs is called "Aggregation Level". The CCE is configured from nine sequential resource elements.

The mobile station UE does not know which CCEs PDCCH addressed to the mobile station UE itself has been assigned to and what the selected Aggregation Level is, and accordingly, needs to search all possible combinations of the CCEs in order to detect the PDCCH addressed to the mobile station UE itself.

However, it is not realistic to search the PDCCH from all the possible combinations, and thus, the mobile communication system according to this embodiment limits the range of the CCEs which each mobile station UE should search.

Specifically, the mobile station UE is configured to search the PDCCH addressed to the mobile station UE itself in a "common search space" and "UE specific search spaces" determined based on the C-RNTI of the mobile station UE.

Figure 2:
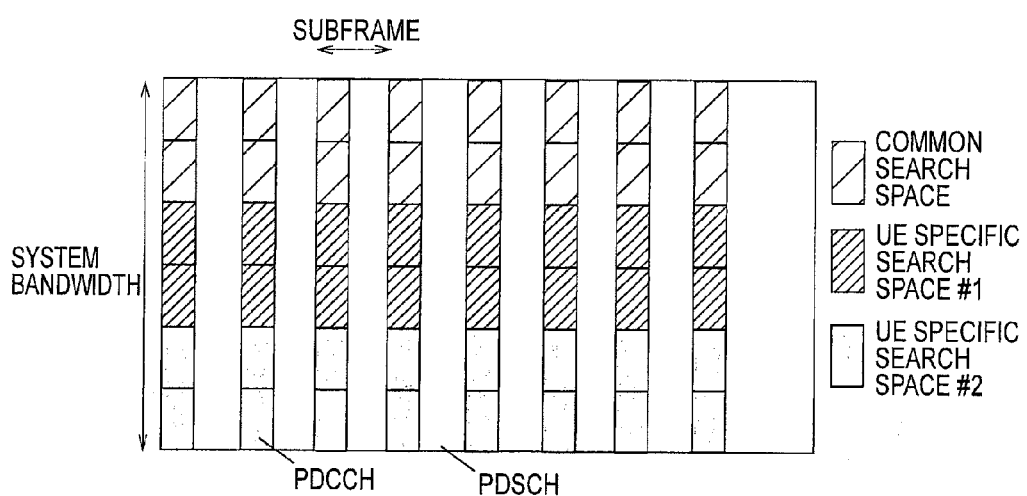
FIG. 2 is a diagram for explaining a method of assigning resources to PDCCHs and PDSCHs in the mobile communication system according to the first embodiment of the present invention.

In an example of FIG. 2, two PDCCHs are transmitted in a common search space, two PDCCHs are transmitted in the UE specific search space #1, and two PDCCHs are transmitted in a UE specific search space #2.

Actually, the number of PDCCHs transmitted in each search space is changed dynamically depending on the number of scheduled mobile stations UE, the Aggregation Levels, and the like. Moreover, the common search space and the UE specific search spaces may overlap with each other.

Figure 3:
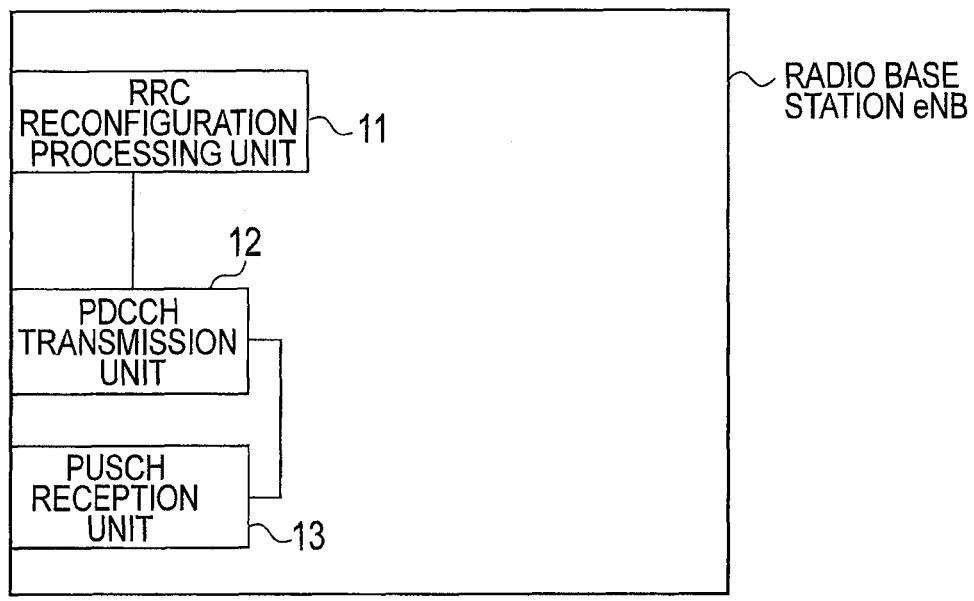
FIG. 3 is a functional block diagram of a radio base station according to the first embodiment of the present invention.

As shown in FIG. 3, the radio base station eNB includes an RRC Reconfiguration processing unit 11, a PDCCH transmission unit 12, and a PUSCH reception unit 13.

The RRC Reconfiguration processing unit 11 is configured to transmit "RRC Reconfiguration" to the mobile station UE, and receive "RRC Reconfiguration complete" from the mobile station UE, thereby performing an RRC Reconfiguration process related to an RRC connection between the radio base station eNB and the mobile station UE.

In this case, the RRC Reconfiguration processing unit 11 may also be configured to notify the mobile station UE of a predetermined range indicating a range over which the mobile station UE should receive PDCCH containing CB-RNTI, by "CB-Config" contained in the "RRC Reconfiguration".

For example, the RRC Reconfiguration processing unit 11 may also be configured to notify the mobile station UE of, as the predetermined range, a range of a subframe.

In such a case, the RRC Reconfiguration processing unit 11 may also notify the mobile station UE of a pattern (a cycle, a frame offset, a subframe offset, "on duration", etc.) of a subframe, such as a DRX pattern.

Moreover, the RRC Reconfiguration processing unit 11 may also be configured to implicitly notify the mobile station UE of the frame offset or the subframe offset determined based on the C-RNTI. For example, the RRC Reconfiguration processing unit 11 may notify the frame offset or the subframe offset designated by "C-RNTI mod group count".

Alternatively, the RRC Reconfiguration processing unit 11 may notify the mobile station UE of the "group count" and a value of "X", and an RRC Reconfiguration processing unit 21 of the mobile station UE may determine, as the predetermined range, a range of one frame among frames satisfying "SFN/group count=C-RNTI mod group count", or may determine, as the predetermined range, a range of X subframes from among frames and subframes satisfying "(SFN×10+subframe number)/(group count)=C-RNTI mod group count".

As a result, the number of mobile stations UE which respond to the uplink scheduling grant included in the PDCCH containing the CB-RNTI in the same subframe is decreased, and the number of mobile stations UE which respond to the uplink scheduling grant is dispersed over the subframes, so that a possibility of the conflict of uplink data signals can be inhibited.

Furthermore, the RRC Reconfiguration processing unit 11 may also be configured to notify the mobile station UE of, as the predetermined range, a range of the search space in the PDCCH.

For example, the RRC Reconfiguration processing unit 11 may notify the mobile station UE of only the common search space, only the UE specific search space #1, only the common search space and UE specific search space #1.

In this case, the RRC Reconfiguration processing unit 11 may notify by handling the UE specific search space #1 of the PDCCH addressed to the C-RNTI of the mobile station UE and the UE specific search space #1 of the PDCCH addressed to the CB-RNTI as either the same space or different spaces.

The radio base station eNB can transmit the uplink scheduling grant by using the same CB-RNTI in different search spaces.

Since the CCEs in which the PDCCH containing the C-RNTI or the PDCCH containing the CB-RNTI should be searched are limited, the process load of the mobile station UE is decreased.

In addition, the RRC Reconfiguration processing unit 11 may also be configured to notify the mobile station UE of, as the predetermined range, the range of the CB-RNTI.

Alternatively, the RRC Reconfiguration processing unit 11 may also be configured to notify the mobile station UE of, as the predetermined range, at least two ranges from among the range of the subframe, the range of the search space in the PDCCH, and the range of the CB-RNTI.

The PDCCH transmission unit 12 is configured to transmit, as a downlink control signal, the uplink scheduling grant through the PDCCH addressed to the C-RNTI of the mobile station UE. In other words, the PDCCH transmission unit 12 is configured to transmit, through the PDCCH, an uplink scheduling grant (uplink scheduling signal) that contains the C-RNTI of the mobile station UE and designates an individual uplink resource.

Moreover, the PDCCH transmission unit 12 is configured to transmit, as a downlink control signal, an uplink scheduling grant through the PDCCH addressed to the CB-RNTI. In other words, the PDCCH transmission unit 12 is configured to transmit, through the PDCCH, an uplink scheduling grant (uplink scheduling signal) that contains the CB-RNTI and designates a shared uplink resource.

In this case, because the uplink scheduling grant containing the C-RNTI of the mobile station UE designates an uplink resource which only the mobile station UE is allowed to use, the uplink source designated by this uplink scheduling grant is called an "individual uplink resource" herein.

Meanwhile, because the uplink scheduling grant containing the CB-RNTI designates an uplink resource which the multiple mobile stations UE are allowed to use, the uplink source designated by this uplink scheduling grant is called a "shared uplink resource" herein.

Note that the CB-RNTI is predetermined identification information that is not the C-RNTI of a designated mobile station UE, and may be designated by either broadcast information by the radio base station eNB or a separate signaling (for example, "RRC Reconfiguration" that is an RRC message) by the radio base station eNB.

The PUSCH reception unit 13 is configured to receive an uplink data signal through the PUSCH which the mobile station UE has sent by using the individual uplink resource or the shared uplink resource.

Figure 4:
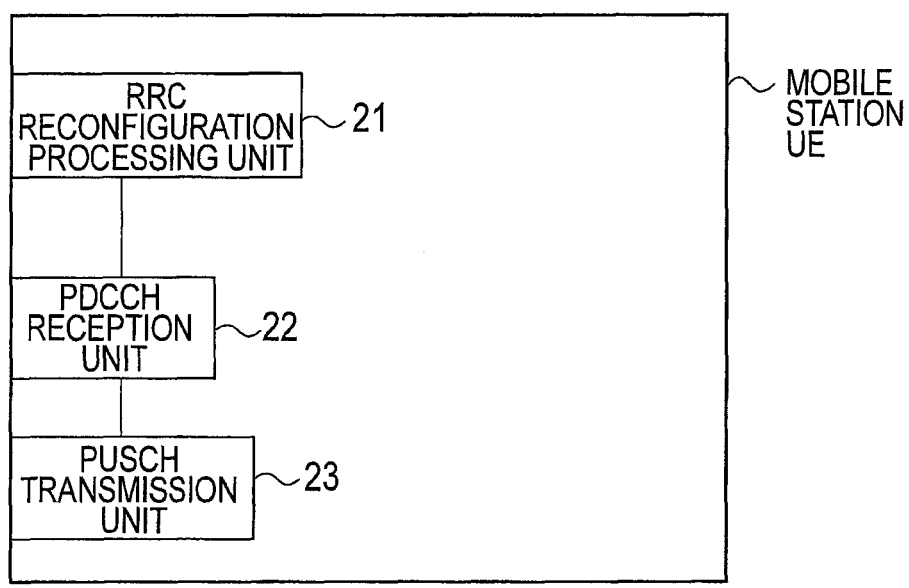
FIG. 4 is a functional block diagram of a mobile station according to the first embodiment of the present invention.

As shown in FIG. 4, the mobile station UE includes the RRC Reconfiguration processing unit 21, a PDCCH reception unit 22, and a PUSCH transmission unit 23.

The RRC Reconfiguration processing unit 21 is configured to perform an RRC Reconfiguration process related to the RRC connection between the mobile station UE and the radio base station eNB.

For example, the RRC Reconfiguration processing unit 21 may also be configured to acquire the above-mentioned predetermined range and the like via the "CB-Config" contained in the "RRC Reconfiguration" transmitted by the radio base station eNB.

The PDCCH reception unit 22 is configured to receive an uplink scheduling grant transmitted through the PDCCH addressed to the C-RNTI of the mobile station UE, that is, an uplink scheduling grant containing the C-RNTI of the mobile station UE through the PDCCH.

Furthermore, the PDCCH reception unit 22 is configured to receive an uplink scheduling grant transmitted through the PDCCH addressed to the CB-RNTI, that is, an uplink scheduling grant containing the CB-RNTI.

For example, the PDCCH reception unit 22 may also be configured to receive an uplink scheduling grant containing the CB-RNTI, within the range of the subframe that has been notified as the predetermined range.

The PDCCH reception unit 22 may also be configured to receive an uplink scheduling grant containing the CB-RNTI, within the range of the search space in the PDCCH that has been notified as the predetermined range.

The PDCCH reception unit 22 may also be configured to receive an uplink scheduling grant containing the CB-RNTI, within the range of the CB-RNTI that has been notified as the predetermined range.

The PUSCH transmission unit 23 is configured to transmit an uplink data signal to the radio base station eNB through the PUSCH, by using the individual uplink resource designated by the uplink scheduling grant containing the C-RNTI of the mobile station UE.

Furthermore, the PUSCH transmission unit 23 is configured to transmit an uplink data signal to the radio base station eNB through the PUSCH, by using the shared uplink resource designated by the uplink scheduling grant containing the CB-RNTI.

(Operation of the Mobile Communication System According to the First Embodiment of the Present Invention)

A description will be given of an operation of the mobile communication system according to the first embodiment of the present invention, with reference to FIG. 5.

Figure 5:
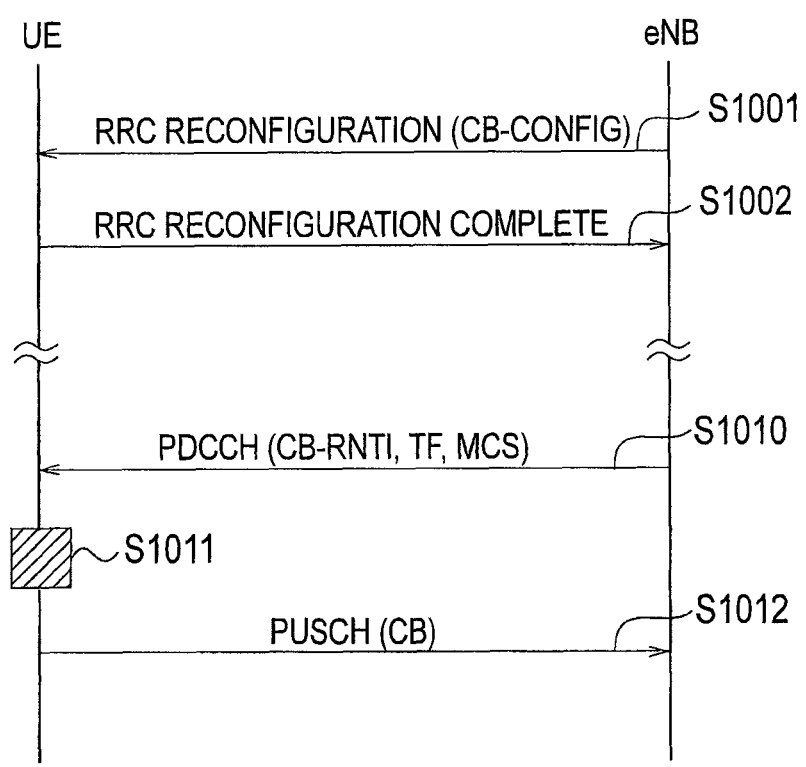
FIG. 5 is a sequence diagram of the operation of the mobile communication system according to the first embodiment of the present invention.

As shown in FIG. 5, in step S1001, the radio base station eNB transmits "RRC Reconfiguration" containing "CB-Config" to the mobile station UE.

In step S1002, the mobile station UE stores a predetermined range notified by the "CB-Config" contained in the received "RRC Reconfiguration", and transmits "RRC Reconfiguration Complete" to the radio base station eNB.

In step S1010, the radio base station eNB transmits an uplink scheduling grant containing CB-RNTI, TF, MCS, etc. to the mobile station UE through the PDCCH.

In step S1011, the mobile station UE receives the uplink scheduling grant containing the CB-RNTI within the above-mentioned predetermined range, and in step S1012, the mobile station UE transmits an uplink data signal through the PUSCH, by using a shared uplink resource designated by the uplink scheduling grant containing the CB-RNTI.

(Operation and Effect of the Mobile Communication System According to the First Embodiment of the Present Invention)

The mobile communication system according to the first embodiment of the present invention limits the predetermined range of the PDCCH searched by each mobile station UE, thereby restricting the mobile stations UE that can respond to the uplink scheduling grant containing the CB-RNTI in each subframe, resulting in the decrease in the possibility of the collision of uplink data signals.

The above-mentioned characteristics of this embodiment may be expressed as follows.

A first characteristic of this embodiment is summarized as a mobile communication method that includes: a step A of notifying a predetermined range to a mobile station UE from a radio base station eNB; a step B of receiving, by the mobile station UE, an uplink scheduling grant (uplink scheduling) containing CB-RNTI (predetermined identification information that is not identification information of a designated mobile station) within the notified predetermined range; and a step C of transmitting an uplink data signal to the radio base station eNB from the mobile station UE, by using a shared uplink resource designated by the uplink scheduling grant.

In the first characteristic of this embodiment, in the step A, the radio base station eNB may notify a range of a subframe as the predetermined range.

In the first characteristic of this embodiment, in the step A, the radio base station eNB may notify a range of a search space in the PDCCH (physical downlink control channel) as the predetermined range.

In the first characteristic of this embodiment, in the step A, the radio base station eNB may notify a range of the CB-RNTI as the predetermined range.

A second characteristic of this embodiment is summarized as a mobile station UE that includes: a PDCCH reception unit 22 configured to receive an uplink scheduling grant containing CB-RNTI within a predetermined range notified from a radio base station eNB; and a PUSCH transmission unit 23 configured to transmit an uplink data signal to the radio base station eNB, by using a shared uplink resource designated by the uplink scheduling grant.

In the second characteristic of this embodiment, the PDCCH reception unit 22 may also be configured to receive the uplink scheduling grant containing the CB-RNTI within a range of a subframe notified as the predetermined range.

In the second characteristic of this embodiment, the PDCCH reception unit 22 may also be configured to receive the uplink scheduling grant containing the CB-RNTI within a range of a search space in the PDCCH notified as the predetermined range.

In the second characteristic of this embodiment, the PDCCH reception unit 22 may also be configured to receive the uplink scheduling grant containing the CB-RNTI within a range of the CB-RNTI notified as the predetermined range.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method comprising:
a step A in which a radio base station notifies a mobile station of a predetermined range;
a step B in which the mobile station receives an uplink scheduling signal containing predetermined identification information within the notified predetermined range, the predetermined identification information not being identification information of a designated mobile station; and
a step C in which the mobile station transmits an uplink data signal to the radio base station from, by using a shared uplink resource designated by the uplink scheduling signal;
wherein in the step A, the radio base station notifies one of a range of a subframe, a search space in a physical downlink control channel, and a range of the predetermined identification information as the predetermined range.

2. A mobile station comprising:
a reception unit configured to receive an uplink scheduling signal containing predetermined identification information within a predetermined range notified from a radio base station, the predetermined identification information not being identification information of a designated mobile station; and
a transmission unit configured to transmit an uplink data signal to the radio base station, by using a shared uplink resource designated by the uplink scheduling signal;
wherein the reception unit is configured to receive the uplink scheduling signal containing the predetermined identification information within a range of one of a subframe, a search space in a physical downlink control channel, and the predetermined identification information notified as the predetermined range.

* * * * *